(12) United States Patent
Searle et al.

(10) Patent No.: US 7,140,149 B2
(45) Date of Patent: Nov. 28, 2006

(54) HIGH DENSITY PLANTER

(76) Inventors: Rance W. Searle, 2525 E. 3760 South, Vernal, UT (US) 84078; Marty G. Hanson, 1960 W. 3300 North, Vernal, UT (US) 84078

( * ) Notice: Subject to any disclaimer, the term of this patent is extended or adjusted under 35 U.S.C. 154(b) by 483 days.

(21) Appl. No.: 10/669,157

(22) Filed: Sep. 22, 2003

(65) Prior Publication Data

US 2004/0098912 A1 May 27, 2004

Related U.S. Application Data

(63) Continuation-in-part of application No. 10/053,493, filed on Jan. 17, 2002, now abandoned.

(60) Provisional application No. 60/262,543, filed on Jan. 17, 2001.

(51) Int. Cl.
A01G 9/02 (2006.01)

(52) U.S. Cl. ............... 47/65.5; 47/66.3; 220/23.4; 220/4.28

(58) Field of Classification Search ............... 47/65.9, 47/66.1, 66.3, 83, 66.4, 85, 66.5, 86, 66.7, 47/87, 45, 65.5, 65; 220/23.4, 4.28
See application file for complete search history.

(56) References Cited

U.S. PATENT DOCUMENTS

| 165,456 | A | | 7/1875 | Van Stone |
|---|---|---|---|---|
| 262,335 | A | | 8/1882 | Wagner |
| 532,687 | A | * | 1/1895 | Mulhaupt ............... 47/73 |
| 986,395 | A | * | 3/1911 | King ............... 47/33 |
| 1,740,057 | A | | 12/1929 | Babich |
| 2,170,714 | A | * | 8/1939 | Ferguson ............... 229/117.12 |
| 3,047,185 | A | * | 7/1962 | Lewis ............... 220/630 |
| 3,293,798 | A | | 12/1966 | Johnson ............... 47/34.12 |
| 3,374,574 | A | | 3/1968 | Haile ............... 47/34.12 |
| 3,389,499 | A | | 6/1968 | Haile ............... 47/33 |
| 3,394,495 | A | | 7/1968 | Mills ............... 47/34.12 |
| 3,529,742 | A | * | 9/1970 | Cumming ............... 220/606 |
| 3,686,791 | A | | 8/1972 | Mills ............... 47/34.12 |
| 3,696,960 | A | * | 10/1972 | Smirle ............... 220/23.4 |
| 3,726,042 | A | * | 4/1973 | Haile ............... 47/83 |
| D238,132 | S | | 12/1975 | Stevens ............... D6/113 |
| 3,990,179 | A | | 11/1976 | Johnson et al. ............... 47/35 |
| 4,057,931 | A | | 11/1977 | Stutelberg et al. ............... 47/83 |
| 4,151,680 | A | * | 5/1979 | Sena ............... 47/39 |
| 4,287,997 | A | * | 9/1981 | Rolfe et al. ............... 220/1.5 |
| 4,622,777 | A | | 11/1986 | Greene, Jr. ............... 47/67 |
| 4,649,667 | A | | 3/1987 | Kitograd ............... 47/66 |
| 5,050,755 | A | * | 9/1991 | Strawder ............... 220/23.4 |
| 5,265,376 | A | | 11/1993 | Less ............... 47/83 |
| 5,333,409 | A | | 8/1994 | Mendes ............... 47/67 |

(Continued)

FOREIGN PATENT DOCUMENTS

AU 9217076 A * 5/1991

(Continued)

*Primary Examiner*—Andrea M. Valenti
(74) *Attorney, Agent, or Firm*—Clayton, Howarth & Cannon, P.C.

(57) ABSTRACT

A portable planter for high-density growth of plants is described. The planter contains a bottom and at least one wall disposed on the bottom for forming a cavity. The at least one wall contains a plurality of holes configured for allowing plant stems to extend therethrough in a generally horizontal orientation. At least one drain hole is formed in the bottom or the at least one wall for draining water from the cavity. Plant growth medium is placed in the cavity, and plants are planted in the plant growth medium such that the stems extend through the holes in the wall.

20 Claims, 7 Drawing Sheets

U.S. PATENT DOCUMENTS

| | | | |
|---|---|---|---|
| 5,381,625 A | | 1/1995 | Wente .............................. 47/83 |
| 5,404,672 A | | 4/1995 | Sanderson ...................... 47/82 |
| 5,457,926 A | * | 10/1995 | Jensen .......................... 52/604 |
| 5,511,342 A | * | 4/1996 | Maso ............................. 47/83 |
| 5,515,987 A | * | 5/1996 | Jacques et al. ................. 220/6 |
| 5,601,384 A | * | 2/1997 | Dawson ....................... 405/284 |
| 5,741,339 A | * | 4/1998 | DuMars et al. ................ 8/611 |
| 5,890,613 A | * | 4/1999 | Williams ................... 220/23.4 |
| 6,058,651 A | | 5/2000 | Perez .......................... 47/65.8 |
| 6,345,466 B1 | | 2/2002 | Venanzi ....................... 47/66.1 |
| 6,381,900 B1 | | 5/2002 | Crowley ...................... 47/66.1 |

FOREIGN PATENT DOCUMENTS

| | | | |
|---|---|---|---|
| DE | | 3307428 A1 * | 3/1983 |
| DE | | 03220531 * | 12/1983 |
| DE | | 3307428 A1 | 9/1984 |
| GB | | 2029187 A | 9/1978 |
| GB | | 2147484 A | 5/1985 |
| GB | | 2212375 A | 7/1989 |
| GB | | 2222063 A | 2/1990 |
| WO | | WO 94/09614 | 5/1994 |

* cited by examiner

HIGH DENSITY PLANTER

CROSS-REFERENCE TO RELATED APPLICATIONS

This application is a continuation-in-part of U.S. application Ser. No. 10/053,493, filed Jan. 17, 2002, now abandoned, which is hereby incorporated by reference in its entirety, which claims the benefit of U.S. Provisional Application No. 60/262,543, filed Jan. 17, 2001.

STATEMENT REGARDING FEDERALLY SPONSORED RESEARCH OR DEVELOPMENT

Not applicable.

BACKGROUND OF THE INVENTION

This invention relates to gardening. More particularly, this invention relates to container gardening and a planter for growing of plants, such as flowers, herbs, vegetables, and the like.

One of the most versatile and creative forms of gardening is container gardening. Planting a container garden is much like creating a floral arrangement. However, live plants can be enjoyed for a longer period of time than can cut flowers. Almost any plant can be grown in a container when proper growing conditions are provided. Container gardens can add a temporary splash of color and art wherever desired. The biggest disadvantages to growing plants in containers are the maintenance requirements of watering and fertilizing. Moreover, the types of containers used in container gardening have not permitted plants to reach their growth potential.

According to conventional wisdom, plants can be grown in anything that will hold soil and allow proper drainage. Some of the more traditionally used containers include terra cotta (clay) pots, plastic pots, hanging baskets, wire baskets lined with sphagnum moss or fibrous liners, concrete planters, planter boxes, whiskey barrels, 5-gallon buckets, tubs, and bushel baskets. Other containers that have been used for growing plants include wooden or plastic window boxes, wooden wine crates, tires, bags of potting soil, garbage bags filled with growth medium (called a sausage garden), and even an old boot. The criteria used for selecting containers typically include making sure that the container has a hole for adequate drainage and that the container is large enough to hold the minimum amount of soil required for mature plants to grow in. In addition, the type of container used depends on the location and the plant selected. For example, use of black containers in full sun should be avoided such that the soil does not become overheated and kill the plants. Terra cotta and other porous containers tend to wick water away from the plants, retain salts, and deteriorate over time. Another criterion believed to be important by many people for selecting a container is the appearance of the container.

U.S. Pat. No. 5,404,672 to Sanderson discloses a modular column planter comprising lower, middle, and upper containers. Each container has a bottom connecting with a sidewall that extends upwardly to define a top opening. The bottom of the lower container includes a post, and the bottoms of the middle and upper containers contain an opening with a hollow column and a lower column extension positioned thereabout. The planter is formed by fitting the respective bottoms of the middle and upper containers in the top openings of the lower and middle containers. The column extension of the middle container fits into the upper end of the post of the lower container, and the column extension of the upper container fits into the upper end of the column of the middle container, thereby forming a watering tube. The planter is used by filling the upper, middle, and lower containers with soil and then planting the roots of plants in the soil such that the foliage portions of these plants grow out from the sidewall openings in the middle and lower containers. Plants in the upper container are rooted such that their foliage grows upwardly from the top opening. Soil in the lower and middle containers is moistened by filling the watering tube, which then discharges to plants growing outward through openings in the sidewalls of these containers.

While prior art containers and container gardening methods are known and are generally suitable for their limited purposes, they possess certain inherent deficiencies that detract from their overall utility in growing plants. For example, traditional containers do not permit the plants to approach their growth potential and produce the mass of foliage that could be produced if growth were not inhibited.

In view of the foregoing, it will be appreciated that providing a container and method of use thereof that facilitates growth of an immense amount of foliage would be a significant advancement in the art.

BRIEF SUMMARY OF THE INVENTION

A planter for high-density growth of plants comprises:
(a) a bottom;
(b) at least one wall disposed on the bottom such that the bottom and the at least one wall define a cavity for receiving a plant growth medium for supporting roots of the plants, wherein the at least one wall comprises a plurality of holes configured for permitting stems of the plants to extend therethrough; and
(c) at least one drain hole configured in the bottom or in the at least one wall adjacent to the bottom for permitting liquids to drain from the cavity.

Another planter for high-density growth of plants comprises:
(a) a first bottom comprising at least one drain hole for permitting liquids to drain therethrough; and
(b) a first front wall, a first back wall, and first and second side walls disposed on the first bottom such that the first bottom, first front wall, first back wall, and first and second side walls define a first cavity for receiving a plant growth medium for supporting roots of the plants, wherein the first front wall and first and second side walls comprise a plurality of holes configured for permitting stems of the plants to extend therethrough.

Advantageously, the planter described in the previous paragraph can further comprise structure disposed on the first side wall configured for permitting attachment of a second bottom, a second front wall, and a second back wall thereto, wherein the second bottom, the second front wall, and the second back wall are configured for being attached to a third side wall such that the second bottom, second front wall, second back wall, first side wall, and third side wall define a second cavity configured for receiving plant growth medium for supporting roots of said plants, wherein said second front wall and third side wall comprise a plurality of holes configured for permitting stems of said plants to extend therethrough. Moreover, this planter can further comprise structure disposed on second side wall configured for permitting attachment of a third bottom, a third front wall, and a third back wall thereto, wherein the third bottom, the third front wall, and the third back wall are configured for being attached to a fourth side wall such that the third bottom, third front wall, third back wall, second side wall, and fourth side wall define a third cavity configured for receiving plant growth medium for supporting roots of the plants, wherein the third front wall and fourth side wall comprise a plurality of holes configured for permitting stems of the plants to extend therethrough.

Still another planter for high-density growth of plants comprises:

(a) a bottom comprising at least one drain hole for permitting liquids to drain therethrough; and (b) a continuous curved wall disposed on the bottom such that the bottom and curved wall define a cavity for receiving a plant growth medium for supporting roots of the plants, wherein the curved wall comprises a plurality of holes configured for permitting stems of the plants to extend therethrough.

Yet another planter for high-density growth of plants comprises:

(a) a bottom comprising a plurality of drain holes for permitting liquids to drain therethrough;

(b) a front wall, a back wall, and two side walls disposed on the bottom such that the bottom, front wall, back wall, and side walls define a cavity for receiving a plant growth medium for supporting roots of the plants, wherein the front wall comprises three rows of eight holes each, and each of the side walls comprises three rows of three holes each, the holes being configured for permitting stems of the plants to extend therethrough.

Another planter for high-density growth of plants comprises:

(a) a bottom comprising a plurality of drain holes for permitting liquids to drain therethrough;

(b) a continuous curved wall disposed on the bottom such that the bottom and curved wall define a cavity for receiving a plant growth medium for supporting roots of the plants, wherein the curved wall comprises three rows of ten holes each, the holes being configured for permitting stems of the plants to extend therethrough, and the curved wall having a circular cross section.

A method for growing plants comprises:

(a) providing a planter comprising:

(i) a bottom, (ii) at least one wall disposed on the bottom such that the bottom and the at least one wall define a cavity for receiving a plant growth medium for supporting roots of the plants, wherein the at least one wall comprises a plurality of holes configured for permitting stems of the plants to extend therethrough, and (iii) at least one drain hole configured in the bottom or in the at least one wall adjacent to the bottom for permitting water to drain from the cavity;

(b) planting plants in the planter such that roots of the plants are covered by plant growth medium held in the cavity of the planter and stems of the plants extend through the plurality of holes; and (c) providing effective amounts of water, light, and nutrients and holding the plants at a temperature suitable for promoting growth thereof.

A method for making a planter comprising:

(a) providing a base member having a longitudinal axis and comprising a first panel and a second panel separated by a first flexible hinge, and a third panel separated from the second panel by a second flexible hinge, wherein the second panel comprises at least one hole configured for permitting liquids to pass therethrough, the third panel comprises a plurality of holes configured for permitting stems of plants to extend therethrough, and the first and second hinges are oriented perpendicular to the longitudinal axis;

(b) bending the base member at the first and second hinges such that a structure having a U-shaped channel having first and second ends is formed; and (c) attaching a first end panel to the first end of the U-shaped channel and a second end panel to the second end of the U-shaped channel, thereby forming a cavity suitable for receiving a plant growth medium, wherein the first and second end panels each comprise a plurality of holes configured for permitting stems of plants to extend therethrough. The method can further comprise:

(d) attaching a top frame to top edges of the first and third panels and the first and second end panels.

DETAILED DESCRIPTION

Before the present high density planter, method of use thereof, and method of making thereof are disclosed and described, it is to be understood that this invention is not limited to the particular configurations, process steps, and materials disclosed herein as such configurations, process steps, and materials may vary somewhat. It is also to be understood that the terminology employed herein is used for the purpose of describing particular embodiments only and is not intended to be limiting since the scope of the present invention will be limited only by the appended claims and equivalents thereof.

The publications and other reference materials referred to herein to describe the background of the invention and to provide additional detail regarding its practice are hereby incorporated by reference. The references discussed herein are provided solely for their disclosure prior to the filing date of the present application. Nothing herein is to be construed as an admission that the inventors are not entitled to antedate such disclosure by virtue of prior invention.

It must be noted that, as used in this specification and the appended claims, the singular forms "a," "an," and "the" include plural referents unless the context clearly dictates otherwise. Thus, for example, reference to a planter containing "a drain hole" includes reference to two or more of such drain holes, reference to "an end wall" includes reference to one or more of such end walls, and reference to "a top bracket" includes reference to two or more of such top brackets.

In describing and claiming the present invention, the following terminology will be used in accordance with the definitions set out below.

As used herein, "comprising," "including," "containing," "characterized by," and grammatical equivalents thereof are inclusive or open-ended terms that do not exclude additional, unrecited elements or method steps. "Comprising" is to be interpreted as including the more restrictive terms "consisting of" and "consisting essentially of."

As used herein, "consisting of" and grammatical equivalents thereof exclude any element, step, or ingredient not specified in the claim.

As used herein, "consisting essentially of" and grammatical equivalents thereof limit the scope of a claim to the specified materials or steps and those that do not materially affect the basic and novel characteristic or characteristics of the claimed invention.

As used herein, "plant growth medium" means soil, soil-less plant growth mixture, and the like, and mixtures thereof. As used herein, "generally horizontal" means horizontal for the most part or approximately horizontal.

Figure 1:
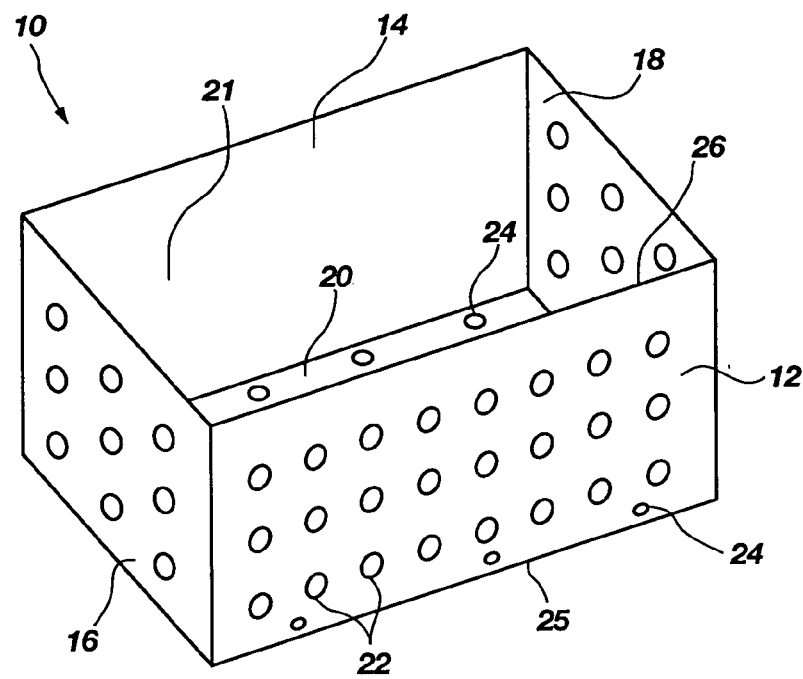
FIG. 1 shows a perspective view of an illustrative high density planter for container gardening according to the present invention.

FIG. 1 shows an illustrative high density planter 10 according to the present invention. The planter 10 comprises a front wall 12, back wall 14, side walls 16 and 18, and a bottom 20. These walls define a cavity 21 for holding a plant growth medium, such as soil, a soil-less plant growth mixture, and the like. The front wall comprises a generally planar member having a plurality of holes 22 formed therein. These holes 22 are configured such that the stem or stems of a plant extend therethrough, with the roots residing in the plant growth medium in the cavity, and the top of the plant outside the planter. A plurality of such holes 22 are also formed in the side walls 16 and 18. The bottom 20 further comprises one or more drain holes 24 for permitting excess water or other liquids to drain out of the planter. Optionally, these drain holes can be instead or additionally located in the front, back, and/or side walls adjacent to the bottom, as shown in FIG. 1.

In one illustrative configuration of the planter of FIG. 1, the front wall is about 53.3 cm (21 inches) in length and about 27.9 cm (11 inches) high, the back wall has the same dimensions as the front wall, the bottom is about 53.3 cm (21 inches) long and about 25.4 cm (10 inches) wide, and the side walls are each about 25.4 cm (10 inches) wide and about 27.9 cm (11 inches) high. In this illustrative configuration, it has been determined that placing the holes in the front wall in three equal rows of 8 holes each, for a total of 24 holes, is optimum for growth of plants. Holes in the side wall are optimally in three equal rows of 3 holes each. These holes are preferably about 4.1 cm (1⅝ inches) in diameter and spaced apart on 6.35 cm (2½ inches) centers. The bottom row is preferably spaced about 3.8 cm (1½ inches) from the bottom edge 25 of the front wall and the top row is preferably spaced about 7.6 cm (3 inches) from the top edge 26 of the front wall. The drain holes 24 illustratively comprise three 1.3-cm (½-inch) diameter holes evenly spaced adjacent to the bottom edge of the front wall.

Figure 2:
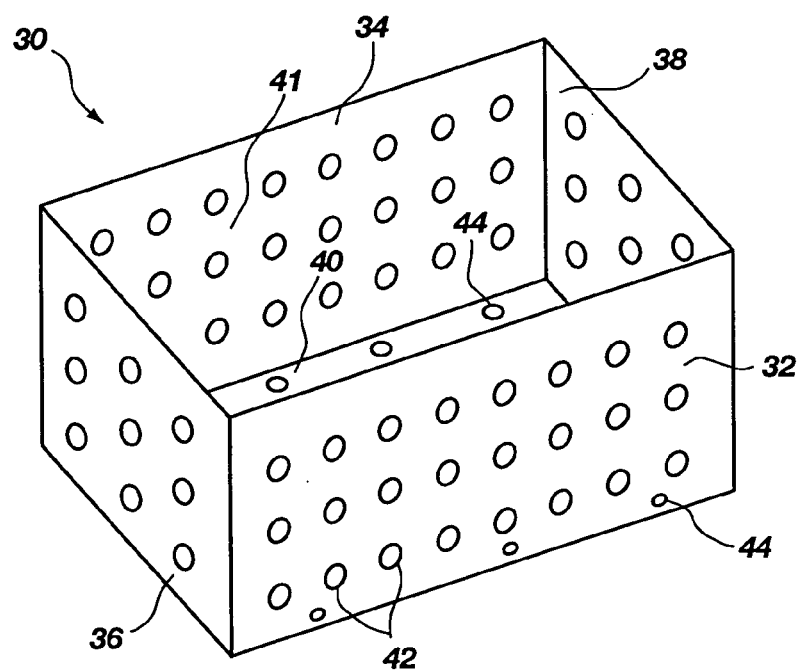
FIG. 2 shows a perspective view of another illustrative high density planter according to the present invention.

FIG. 2 shows another illustrative embodiment of the invention. This planter 30 comprises a front wall 32, back wall 34, side walls 36 and 38, and bottom 40, which define a cavity 41 for receiving plant growth medium. This planter differs from the planter of FIG. 1 in that both the front wall 32 and the back wall 34 comprise a plurality of holes 42, through which the stems of plants may extend. A plurality of such holes 42 are also formed in side walls 36 and 38. Drain holes 44 may be formed in the bottom and/or the front and back walls.

In one illustrative configuration of the planter of FIG. 2, the front wall is about 53.3 cm (21 inches) in length and about 27.9 cm (11 inches) high, the back wall has the same dimensions as the front wall, the bottom is about 53.3 cm (21 inches) long and about 33.0 cm (13 inches) wide, and the side walls are each about 33.0 cm (13 inches) wide and about 27.9 cm (11 inches) high. In this illustrative configuration, it has been determined that placing the holes in three equal rows of 8 holes each, for a total of 24 holes in both the front wall and the back wall, is optimum for growth of plants. Additionally, placing holes in three equal rows of 3 or 4 holes each in each of the side walls has been determined to be optimal.

Figure 3:
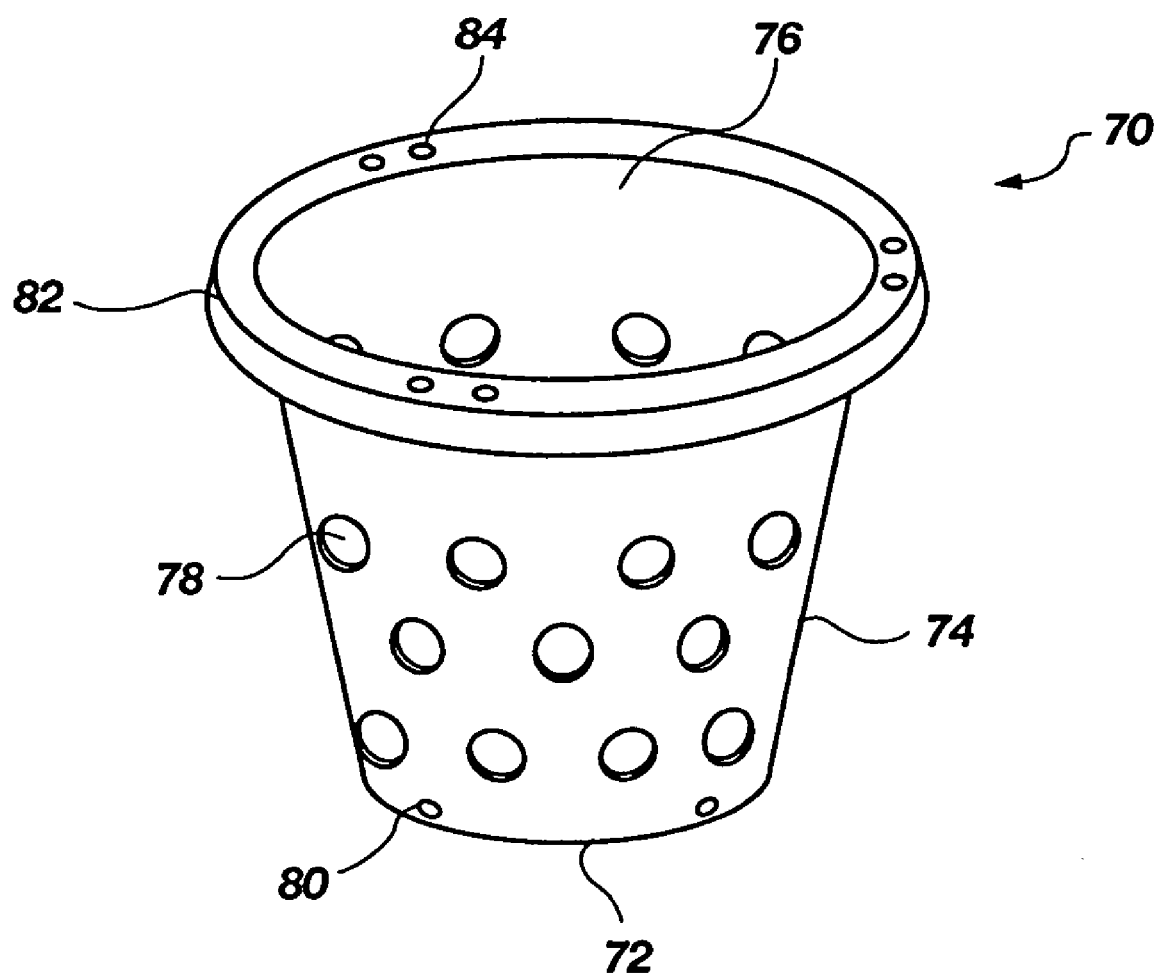
FIG. 3 shows a perspective view of yet another illustrative high density planter according to the present invention.

FIG. 3 shows yet another illustrative embodiment of the invention. This planter 70 is in the shape of a basket, comprising a bottom 72 and a continuous curved side wall 74. In this embodiment, the side wall is circular in cross section. The bottom and side wall define a cavity 76 for receiving plant growth medium. The side wall comprises a plurality of holes 78 through which plant stems may extend. These holes can be arranged in rows. The bottom and/or side wall further comprise one or more drain holes 80 for draining liquids from the plant growth medium. The top edge of the side wall contains a rim 82 into which holes 84 are formed. Apparatus for hanging the planter from a support can be attached to these holes 84.

In one illustrative embodiment of the planter of FIG. 3, the side wall is about 36.6 cm (14 inches) high with a diameter of about 38.1 cm (15 inches) at the top and about 25.4 cm (10 inches at the bottom. Illustratively, the holes can be configured in three rows of the same or different number of holes. For example, one illustrative embodiment of the present invention contains three rows of 10 holes each. In another illustrative embodiment, the top row has 10 holes, the middle row has 9 holes, and the bottom row has 8 holes. The bottom row of holes can be spaced about 3.8 cm (1.5 inches) from the bottom, and the top row can be spaced about 10.2 cm (4 inches) from the top.

A person of ordinary skill in the art can make other variations of the present invention based on the description provided herein without departing from the spirit of the invention. For example, the cross section of the planter can be circular, triangular, rectangular, square, pentagonal, hexagonal, and so forth. Further, the planter can be fabricated to imitate the appearance of a whiskey barrel, for example. It will also be appreciated that the holes through which the stems of the plants extend can also take various shapes. For example, these holes can be circular, triangular, square, hexagonal, octagonal, and so forth. The shape of the planter and the shape of the holes through which the plant stems extend are limited only by functionality.

The size of the holes through which the stems of the plants extend is also limited only by functionality. An illustrative method for planting plants in the planter comprises transplanting seedlings from a flat. A seedling is removed from the flat, and the root ball is inserted through one of the holes in a wall of the planter such that the stem extends through the hole and the foliage is on the exterior of the planter. The roots are then covered with plant growth medium. Therefore, the hole should be large enough to permit the root ball to be inserted through the hole in the wall without damaging the roots in the process. However, the hole should not be so large that the plant growth medium is not readily retained in the cavity of the planter. It has been determined that a diameter of about 5.1 cm (2 inches) is as large as can be routinely used without the need for some type of secondary barrier to retain the plant growth medium in the cavity of the planter. With holes less than about 5.1 cm (2 inches) in diameter, the root ball can be placed adjacent to the hole is such a way that the plant growth medium is blocked from leaking from the cavity through the hole. If a hole greater than about 5.1 cm is used, then it is advantageous to use a secondary barrier, such as a plastic sheet or net material, or the like, to assist in retaining the plant growth medium in the cavity of the planter. For example, a plastic sheet can be used to line the inner wall of the planter. Holes can be formed in the plastic sheet to register with the location of the holes in the wall of the planter. Next, the root ball of a plant is inserted through a hole in the wall of the planter and through the corresponding hole in the plastic sheet such that the stem of the plant extends through both the hole in the plastic sheet and the hole in the wall of the planter. The plastic sheet assists in retaining the plant growth medium in the cavity of the planter.

The planters of the present invention can be made of any suitable materials, such as wood, plastics, clay, metal, and the like, and combinations thereof. Due to the disadvantages of wood and clay noted above, these materials are not optimal. Metal is also disadvantageous due to its weight. Plastics, especially plastic materials that can be molded into the desired shapes, are especially preferred due to their low cost, light weight, strength, and durability. Planters according to the present invention are illustratively made of light weight materials such that the planters are portable and can be readily moved from one location to another by a person of ordinary strength. Planters according to the present invention can be molded into the desired shapes according to procedures well known in the art of plastics molding. Such planters can be made in any color, such as the traditional red of clay pots, green, and so forth.

Figure 4:
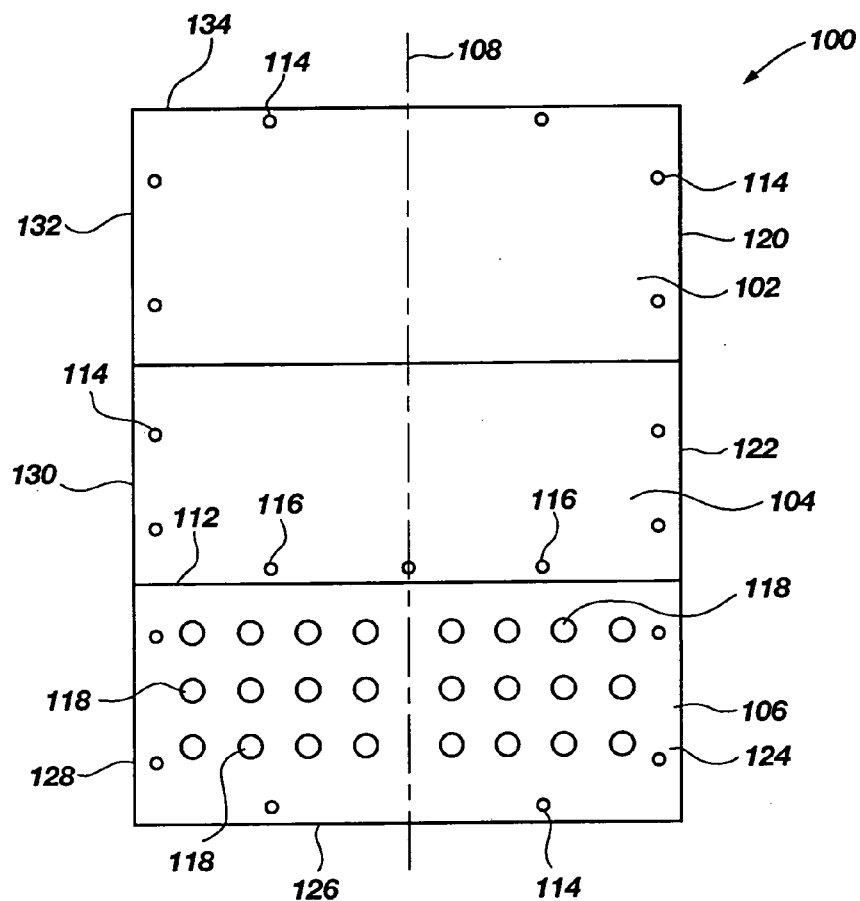
FIG. 4 shows a top view of a base member according to the present invention.

FIGS. 4–10 show how molded plastic parts can be used according to the present invention to make a planter similar to the planter illustrated in FIG. 1. FIG. 4 shows a base member 100 comprising a first panel 102, second panel 104, and third panel 106. The first panel 102 forms the back wall of the planter, the second panel 104 forms the bottom of the planter, and the third panel 106 forms the front wall of the planter. The base member 100 has a longitudinal axis, illustrated by line 108. Separating the three panels and perpendicular to the longitudinal axis are two flexible hinges 110 and 112. Small holes 114 are formed near the edge of the base member 100 at intervals for receiving plastic rivets, which are used to attach the various parts that make up the planter to each other, as will be described in more detail below. It will be appreciated that other types of fasteners could be used instead of rivets. Such other types of fasteners could include screws, bolts, nails, and the like. Illustratively, such holes could be about 0.635 cm (0.25 inch) in diameter. Adjacent to hinge 112, drain holes 116 are formed in the second panel 104. These drain holes will eventually be in the bottom of the planter and will serve for draining fluids from the planter. Illustratively, these drain holes can be about 1.3 cm (0.5 inch) in diameter. The third panel 106 contains holes 118 formed therein that will eventually function for having the stems of the plants extend therethrough. These holes 118 can be about 4.1 cm (1⅝ inches) in diameter and spaced apart on 6.35 cm (2½ inches) centers, for example.

To facilitate describing the manufacture of the planter from the various parts thereof, the perimeter of base member 100 also contains edges 120, 122, 124, 126, 128, 130, 132, and 134.

Figure 5:
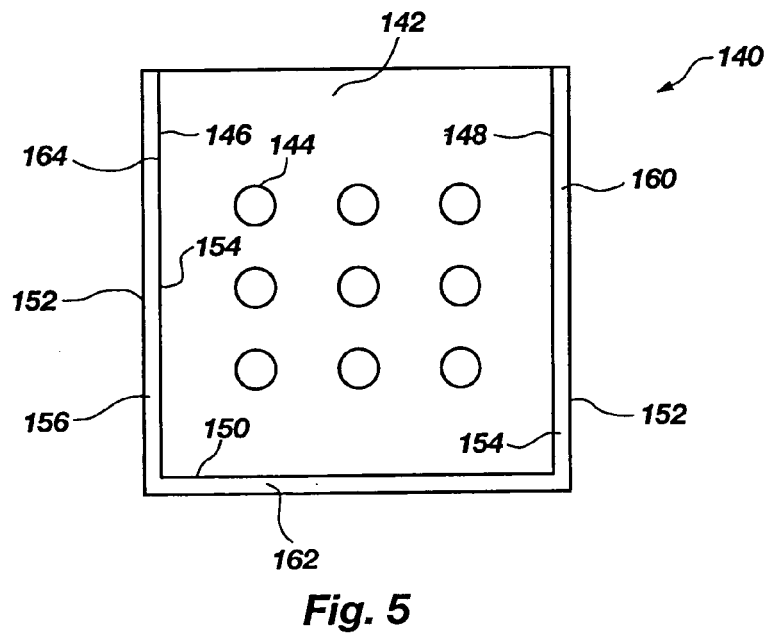
FIG. 5 shows a side elevation view of an end panel according to the present invention.
Figure 6:
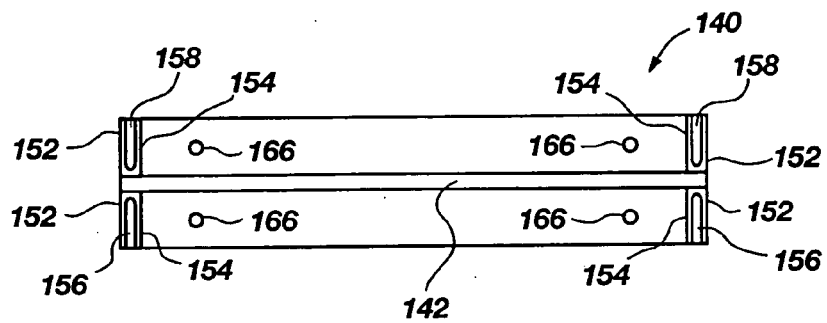
FIG. 6 shows a top view of the end panel of FIG. 5 according to the present invention.
Figure 7:
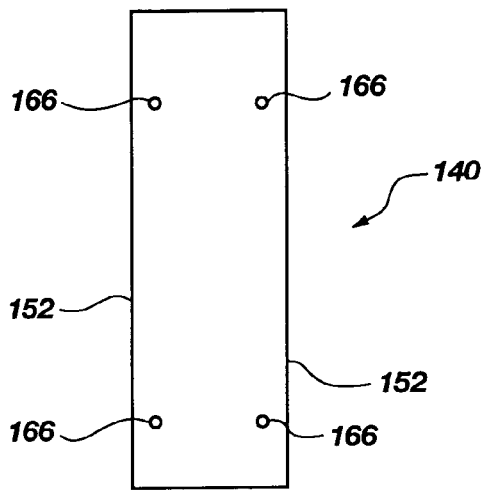
FIG. 7 shows a front elevation view of the end panel of FIG. 5 according to the present invention.

FIGS. 5–7 show an end panel 140 that forms the side walls of the planter. The end panel 140 comprises a partition member 142 comprising holes 144 through which the stems of the plants will extend in the finished planter. At the left edge 146, right edge 148, and bottom edge 150 of the partition member 142 there extend at approximately right angles two closely spaced apart flanges 152 and 154 that form two channels 156 and 158 configured for receiving certain perimeter edges of the base member 100 of FIG. 4. Although each of channels 156 and 158 is continuous, for convenience in describing the fitting of the perimeter edges of the base member 100 thereinto, sections of channel 156 in FIG. 5 are separately labeled as channel sections 160, 162, and 164. Small holes 166 are formed in the flanges 152 and 154 for receiving plastic rivets for attaching the end panel 140 to the base member 100.

Figure 8:
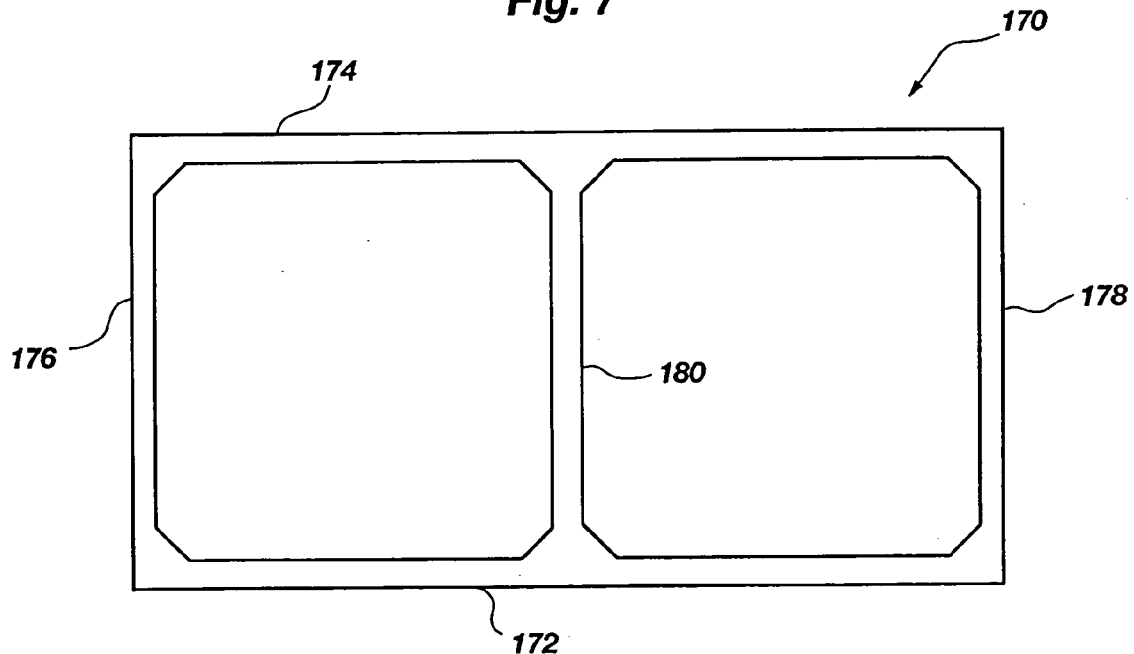
FIG. 8 shows a top view of a top bracket according to the present invention.
Figure 9:
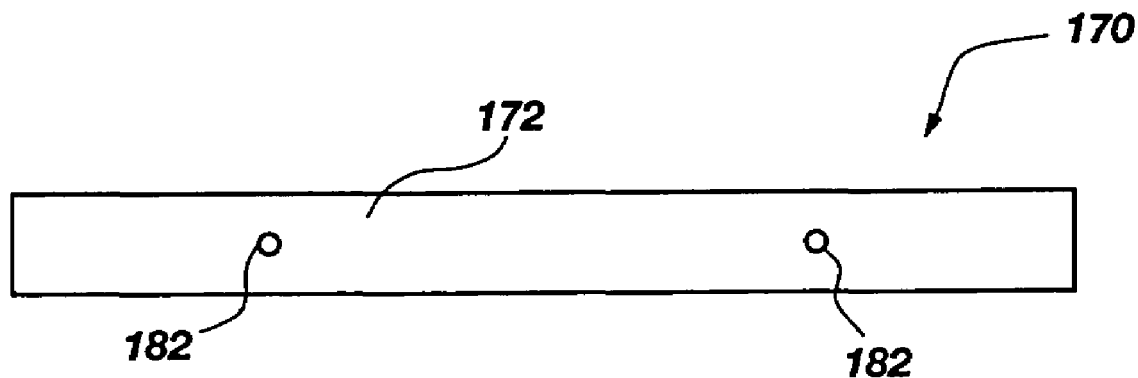
FIG. 9 shows a front elevation view of the top bracket of FIG. 8 according to the present invention.
Figure 10:
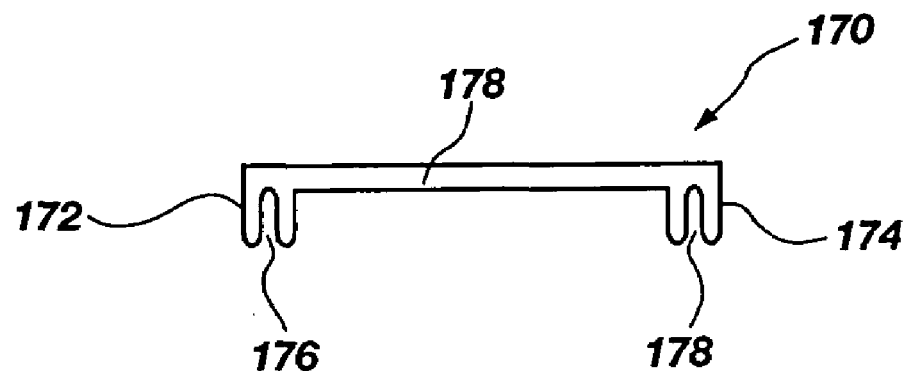
FIG. 10 shows a side elevation view of the top bracket of FIG. 8 according to the present invention.

FIGS. 8–10 show a top bracket 170 comprising a front rail 172, back rail 174, two side rails 176 and 178, and a middle rail 180. The front rail 172 comprises a channel 176 on the underside thereof for receiving edge 126 of the molded plastic member 100, and back rail 174 comprises a channel 178 on the underside thereof for receiving edge 134 of molded plastic member 100. Small holes 182 are formed in front rail 172 and back rail 174 for receiving plastic rivets for attaching the base member 100 to the top bracket 170.

Figure 11:
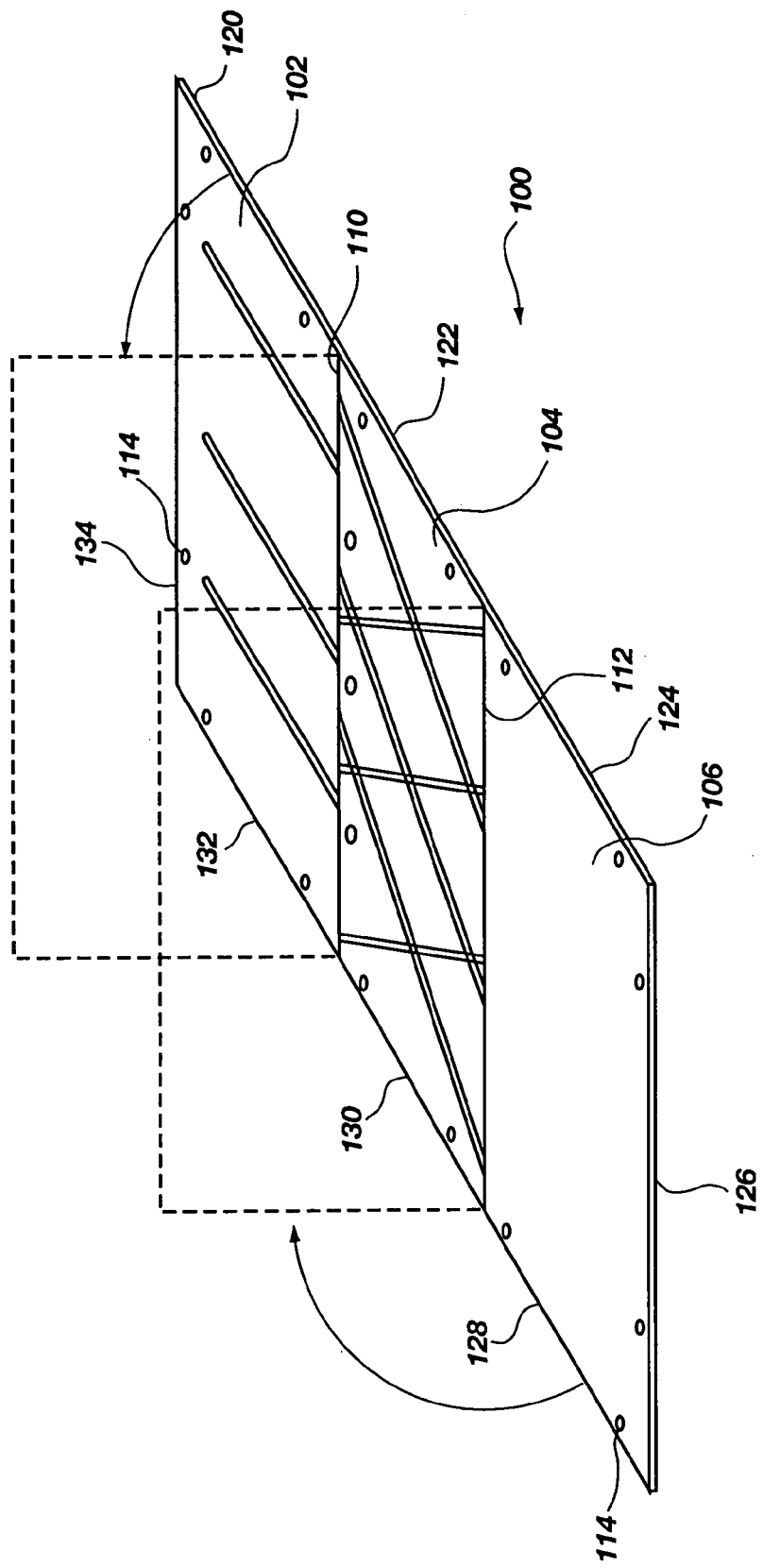
FIG. 11 shows a perspective view of the base member of FIG. 4 with the front and back panels folded into a perpendicular position shown in phantom.
Figure 12:
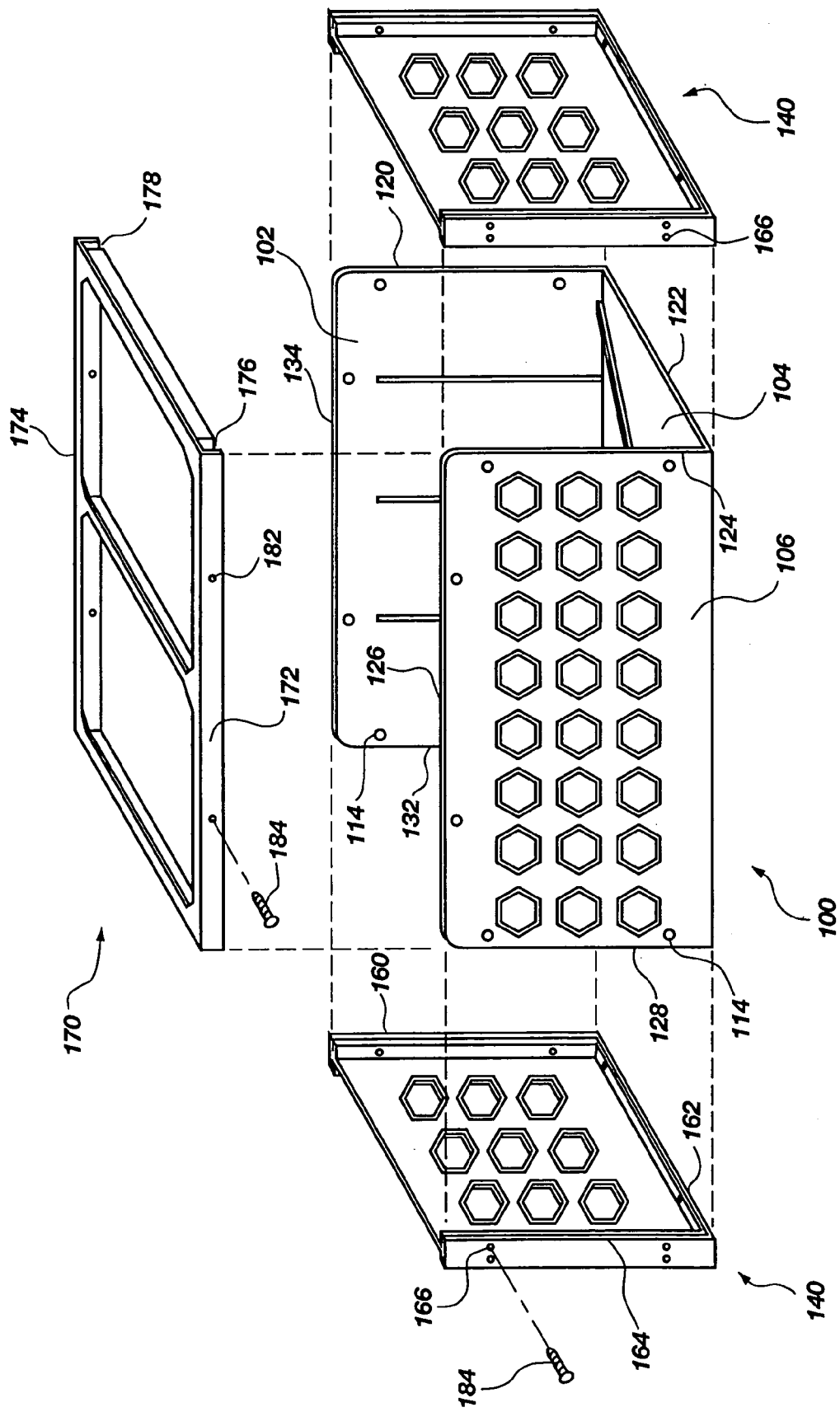
FIG. 12 shows a perspective exploded view of a planter according to the present invention.

The planter according to the present invention comprising components described in FIGS. 4–10 is fabricated as follows, as shown in FIGS. 11–12. First, the base member 100 is folded along the flexible hinges 110 and 112 such that a U-shaped configuration is obtained with panel 104 forming a horizontal bottom, and panels 102 and 106 forming vertical back and front walls, respectively. Next, an end panel 140 is disposed on the U-shaped base member 100 such that edge 120 is received in channel section 164, edge 122 is received in channel section 162, and edge 124 is received in channel section 160. Plastic rivets 184 or other fasteners are inserted through holes 166 in the end panel 140 and through holes 114 in the base member 100 for securing the end panel to the base member. Another end panel is then disposed on the other end of the U-shaped base member 100 such that edge 128 is received in channel section 164, edge 130 is received in channel section 162, and edge 132 is received in channel section 160. Plastic rivets or other fasteners are then inserted through holes 166 in the second end panel 140 and through holes 114 in the base member 100 for securing the second end panel to the base member. Finally, the top bracket 170 is disposed on the U-shaped base member having the end panels disposed thereon such that edge 126 is received in channel 176, and edge 134 is received in channel 178. Plastic rivets 184 or other fasteners are then inserted through holes 182 in the front rail 172 and back rail 174 and holes 114 in the base member 100 for securing the third panel 106 to the front rail 172 and the first panel 102 to the back rail 174.

It will be appreciated that the planter described in FIGS. 4–10 is modular. Since the end panel 140 contains channel 156 on one side of the partition member 142 and channel 158 on the other side of the partition member 142, a base member 100 can be disposed in each of these channels 156 and 158. Thus, by appropriate use of three end panels 140, two base members 100, and two top brackets 170, a planter containing two cavities for receiving plant growth medium can be constructed. Similarly, use of four end panels, three base members, and three top brackets results in a planter containing three cavities for receiving plant growth medium. According to this model, a planter of varying selected lengths can be produced.

The planters of the present invention are used by, first, filling the cavity of the planter with plant growth medium to a level just below the bottom of the first row of holes. Plants growing in small, individual containers or flats are then transplanted into the planter by either placing the roots and associated soil or potting mix through a selected hole from the outside such that the stem extends through the hole, or by extending the stem through the hole from the inside. After a row of plants is placed, then additional plant growth medium is placed in the cavity such that the roots of the first row of plants are covered to the bottom of the next highest row of holes. This procedure is then repeated until, preferably, all of the holes are used and the planter is filled with plant growth medium to near the top of the planter. At this point, additional plants may be planted in a conventional manner, with their stems oriented substantially vertically and extending out of the planter through the open top. In a planter such as the illustrative planter of FIG. 1, it is advantageous to plant such vertically oriented plants near the back wall of the planter where there is room for them to growth without interference from the horizontally oriented plants.

The plant growth medium can be any plant growth medium know in the art, such as soil, soil-less mix, and the like. A soil-less mix is preferred, however, because of fewer or no problems with pH regulation, wash-out, and soil leaking.

After planting, the plants should be watered and fertilized according to methods well known in the art. Normally the plants should be watered on a daily basis. As the plants grow, the horizontally oriented stems will turn upward in a direction generally perpendicular to the earth's surface. As the mass of plant material increases in weight, the stems will hang downward, eventually creating a massive wall of foliage. Placing the planter on a pedestal, porch, or other raised support will permit the foliage to continue to hang downward and plant growth continues. The wall of foliage will hang below the bottom of the planter, and air can circulate through the foliage, reducing the humidity of the microenvironment of the plants and reducing susceptibility to mold and mildew infestation and infection. Moreover, as long as the foliage does not touch the ground or hang within about 4 inches of the ground, snails and slugs are unable to infest the foliage. If the foliage hangs too near the ground, the foliage can be trimmed to keep a space between the foliage and the ground.

The invention claimed is:

1. A planter for high-density growth of plants comprising:
   (a) a first bottom;
   (b) a first front wall, a first back wall, and first and second side walls disposed on said first bottom such that said first bottom, first front wall, first back wall, and first and second side walls define a first cavity for receiving a plant growth medium for supporting roots of said plants, wherein said first front wall and first and second side walls comprise a plurality of holes configured for permitting stems of said plants to extend therethrough, and wherein the first bottom, first front wall, or first back wall comprises at least one drain hole for permitting liquids to drain therethrough; and
   (c) a first flange disposed on said first side wall configured for permitting attachment of a second bottom, a second front wall, and a second back wall thereto, and a second flange disposed on said second side wall configured for permitting attachment of a third bottom, a third front wall, and a third back wall thereto.

2. The planter of claim 1 wherein said plurality of holes are configured in at least two rows.

3. The planter of claim 1 wherein said first back wall further comprises a plurality of holes configured for permitting stems of said plants to extend therethrough.

4. The planter of claim 3 wherein said plurality of holes comprising the first back wall are configured in at least two rows.

5. The planter of claim 1 further comprising said second bottom, second front wall, and second back wall disposed on said first flange, wherein a third side wall is disposed on said second bottom, said second front wall, and said second back wall such that said second bottom, second front wall, second back wall, first side wall, and third side wall define a second cavity configured for receiving plant growth medium for supporting roots of said plants, wherein said second front wall and third side wall comprise a plurality of holes configured for permitting stems of said plants to extend therethrough.

6. The planter of claim 5 wherein said second back wall comprises a plurality of holes configured for permitting stems of said plants to extend therethrough.

7. The planter of claim 1 further comprising said third bottom, third front wall, and third back wall disposed on said second flange, wherein a fourth side wall is disposed on said third bottom, said third front wall, and said third back wall such that said third bottom, third front wall, third back wall, second side wall, and fourth side wall define a third cavity configured for receiving plant growth medium for supporting roots of said plants, wherein said third front wall and fourth side wall comprise a plurality of holes configured for permitting stems of said plants to extend therethrough.

8. The planter of claim 7 wherein said third back wall comprises a plurality of holes configured for permitting stems of said plants to extend therethrough.

9. The planter of claim 1 wherein the first front wall and the first back wall are each disposed on the first bottom with a hinge.

10. The planter of claim 9 further comprising a bracket disposed on the first front wall, first back wall, and first and second side walls.

11. The planter of claim 1 further comprising a bracket disposed on the first front wall, first back wall, and first and second side walls.

12. A planter for high-density growth of plants comprising:
   (a) a first bottom;
   (b) a first front wall, a first back wall, and first and second side walls disposed on the first bottom such that the first bottom, first front wall, first back wall, and first and second side walls define a first cavity for receiving a plant growth medium for supporting roots of the plants, wherein
   the first front wall and first back wall are each disposed on the first bottom with a hinge,
   the first front wall and first and second side walls comprise a plurality of holes configured for permitting stems of the plants to extend therethrough, and the first bottom, first front wall, or first back wall comprises at least one drain hole for permitting liquids to drain therethrough; and (c) a first structure disposed on said first side wall configured for permitting attachment of a second bottom, a second front wall, and a second back wall thereto, and a second structure disposed on said second side wall configured for permitting attachment of a third bottom, a third front wall, and a third back wall thereto.

13. The planter of claim 12 further comprising a bracket disposed on the first front wall, first back wall, and first and second side walls.

14. The planter of claim 12 wherein the plurality of holes are configured in at least two rows.

15. The planter of claim 12 wherein the first back wall further comprises a plurality of holes configured for permitting stems of the plants to extend therethrough.

16. The planter of claim 12 further comprising the second bottom, second front wall, and second back wall disposed on the first structure wherein a third side wall is disposed on the second bottom, the second front wall, and the second back wall such that the second bottom, second front wall, second back wall, first side wall, and third side wall define a second cavity configured for receiving plant growth medium for supporting roots of the plants, wherein the second front wall, second back wall, and third side wall comprise a plurality of holes configured for permitting stems of the plants to extend therethrough.

17. The planter of claim 12 further comprising the third bottom, third front wall, and third back wall disposed on the second structure, wherein a fourth side wall is disposed on the third bottom, the third front wall, and the third back wall such that the third bottom, third front wall, third back wall, second side wall, and fourth side wall define a third cavity configured for receiving plant growth medium for supporting roots of the plants, wherein the third front wall, third back wall, and fourth side wall comprise a plurality of holes configured for permitting stems of the plants to extend therethrough.

18. The planter of claim 12 wherein the first structure and the second structure are flanges.

19. A planter for high-density growth of plants comprising:

(a) a first bottom;

(b) a first front wall, a first back wall, and first and second side walls disposed on the first bottom such that the first bottom, first front wall, first back wall, and first and second side walls define a first cavity for receiving a plant growth medium for supporting roots of the plants, wherein the first front wall and first and second side walls comprise a plurality of holes configured for permitting stems of the plants to extend therethrough, and the first bottom, first front wall, or first back wall comprises at least one drain hole for permitting liquids to drain therethrough;

(c) a first structure disposed on said first side wall configured for permitting attachment of a second bottom, a second front wall, and a second back wall thereto, and a second structure disposed on said second side wall configured for permitting attachment of a third bottom, a third front wall, and a third back wall thereto; and (d) a bracket disposed on the first front wall, first back wall, and first and second side walls.

20. The planter of claim 19 wherein the first structure and second structure are flanges and wherein the first front wall and the first back wall are each disposed on the first bottom with a hinge.

* * * * *